Oct. 21, 1924.

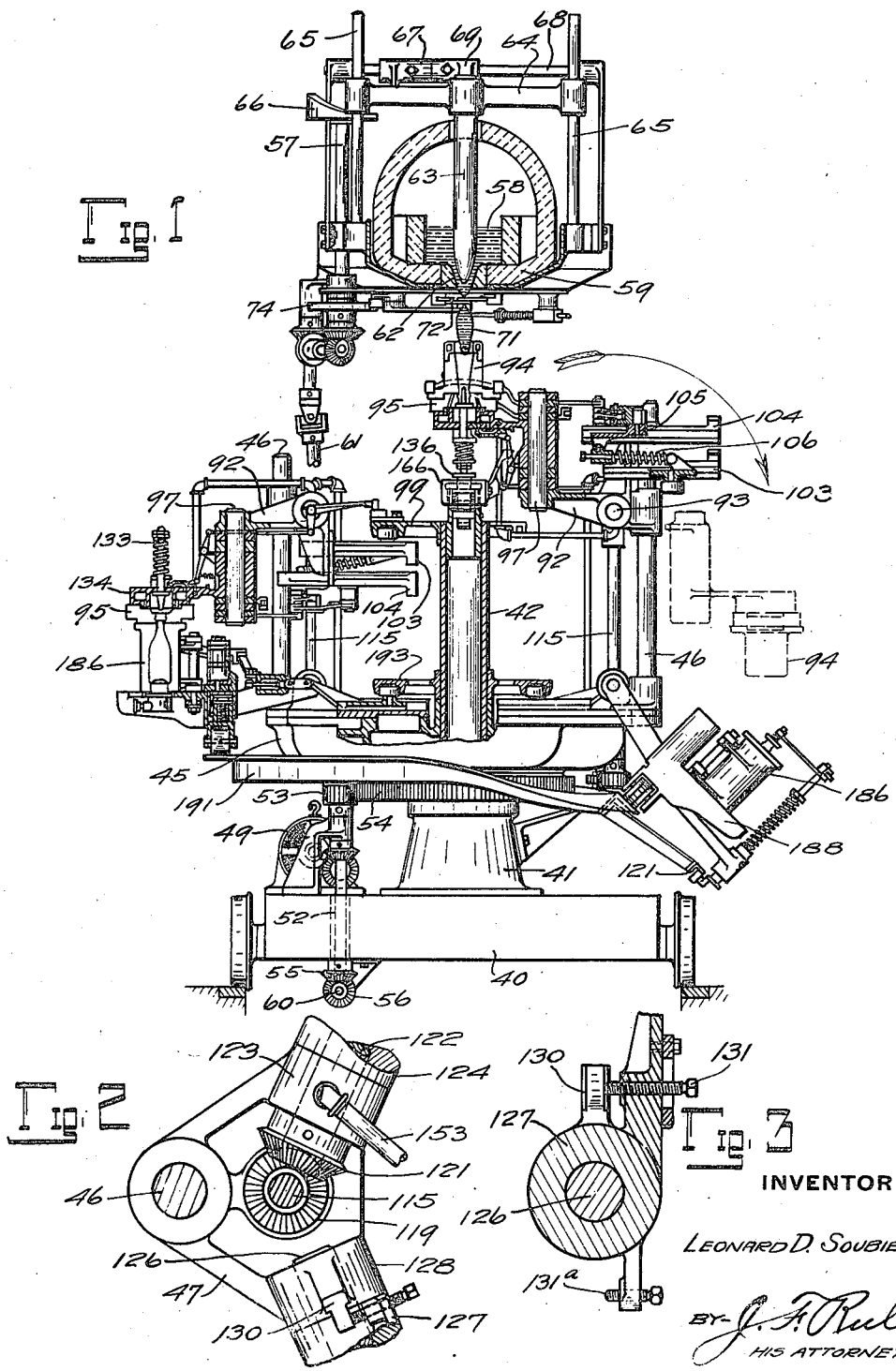

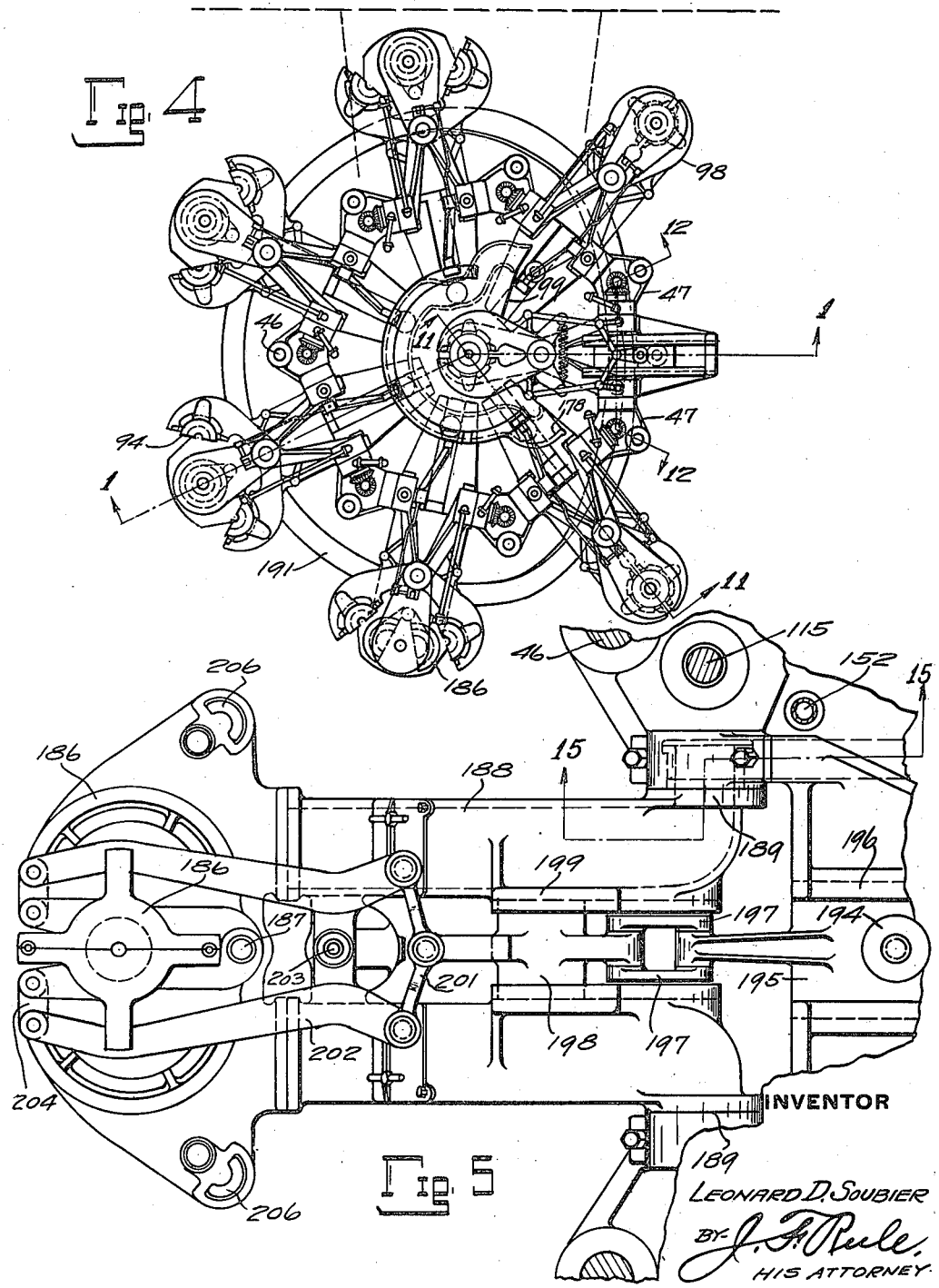

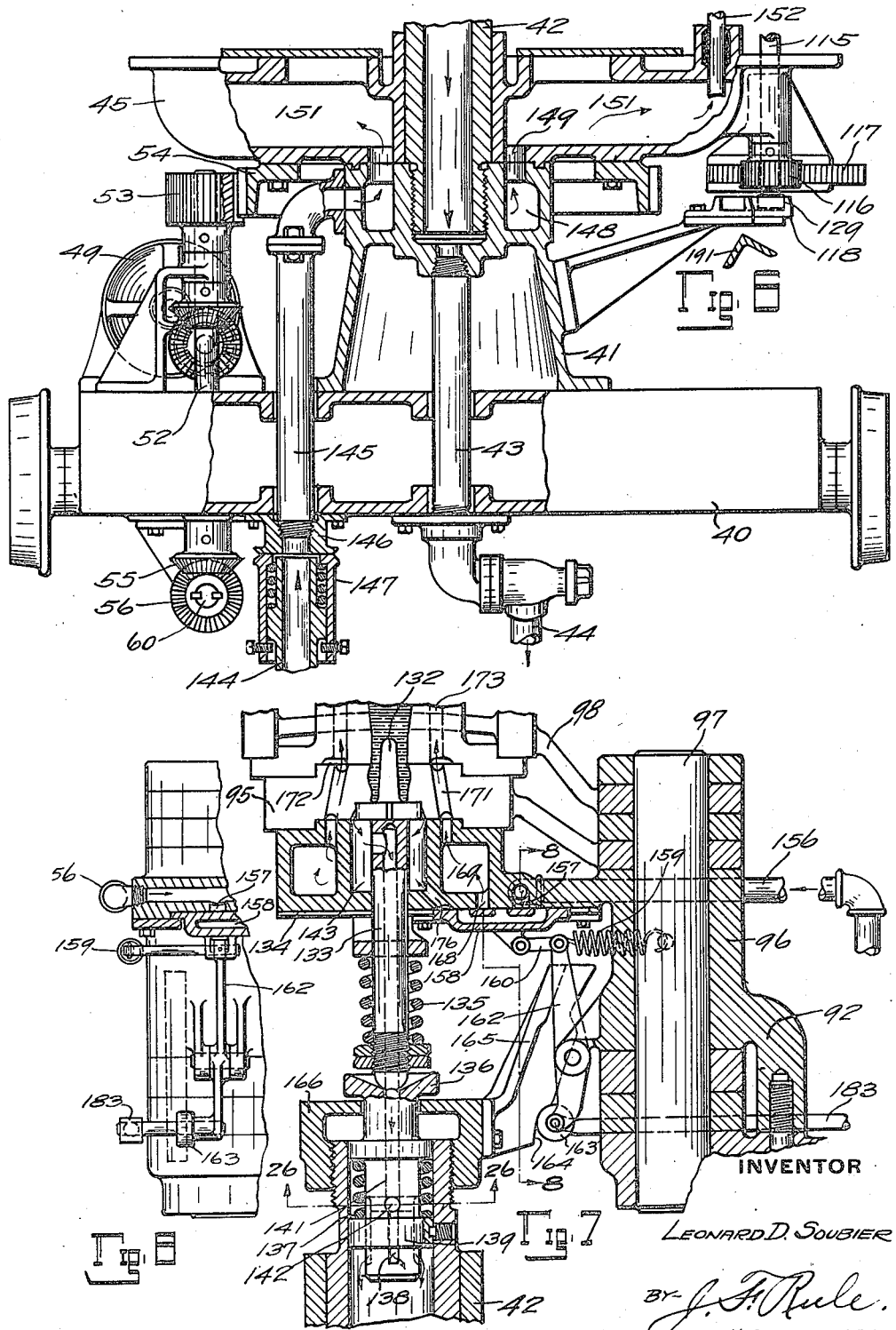

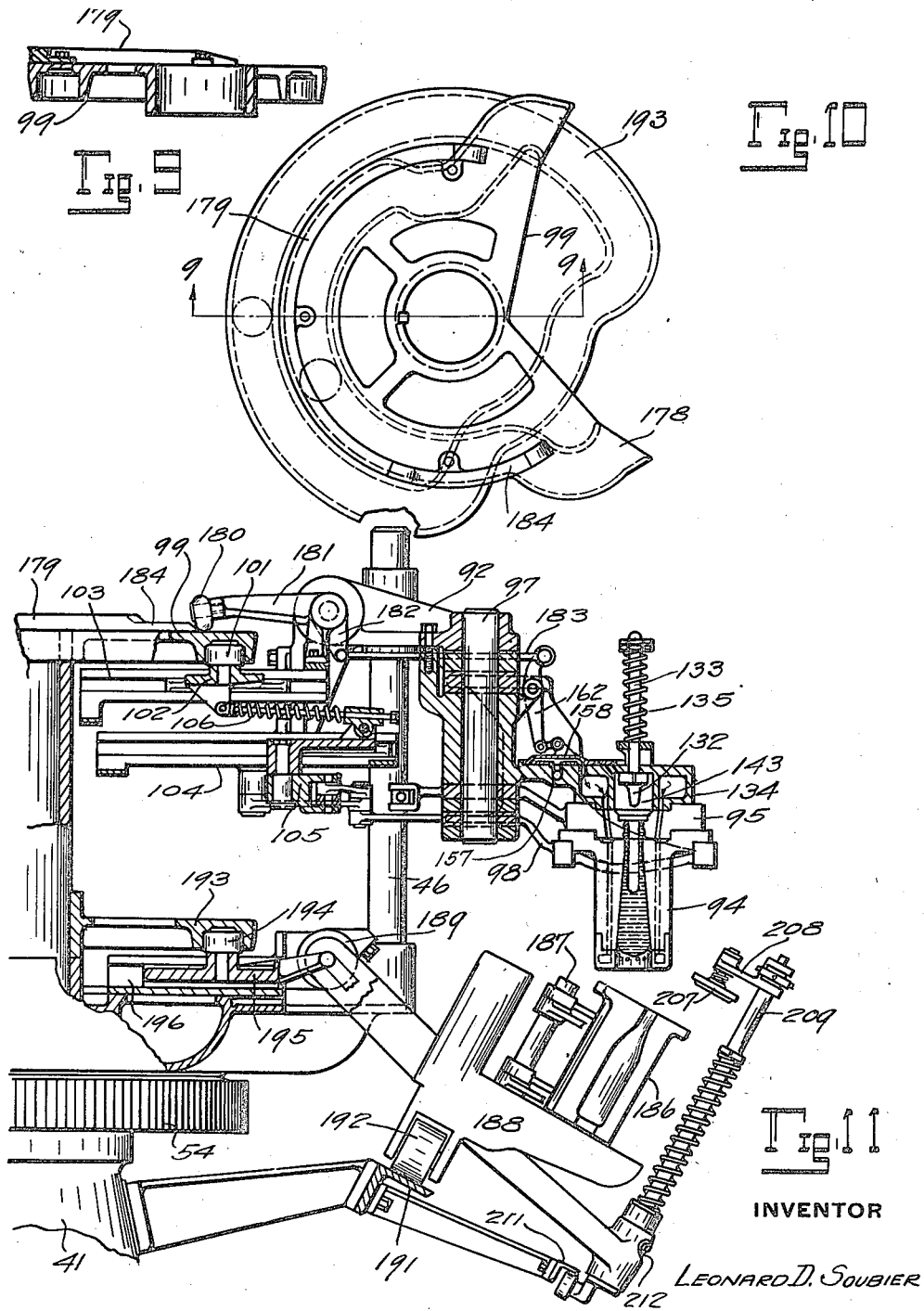

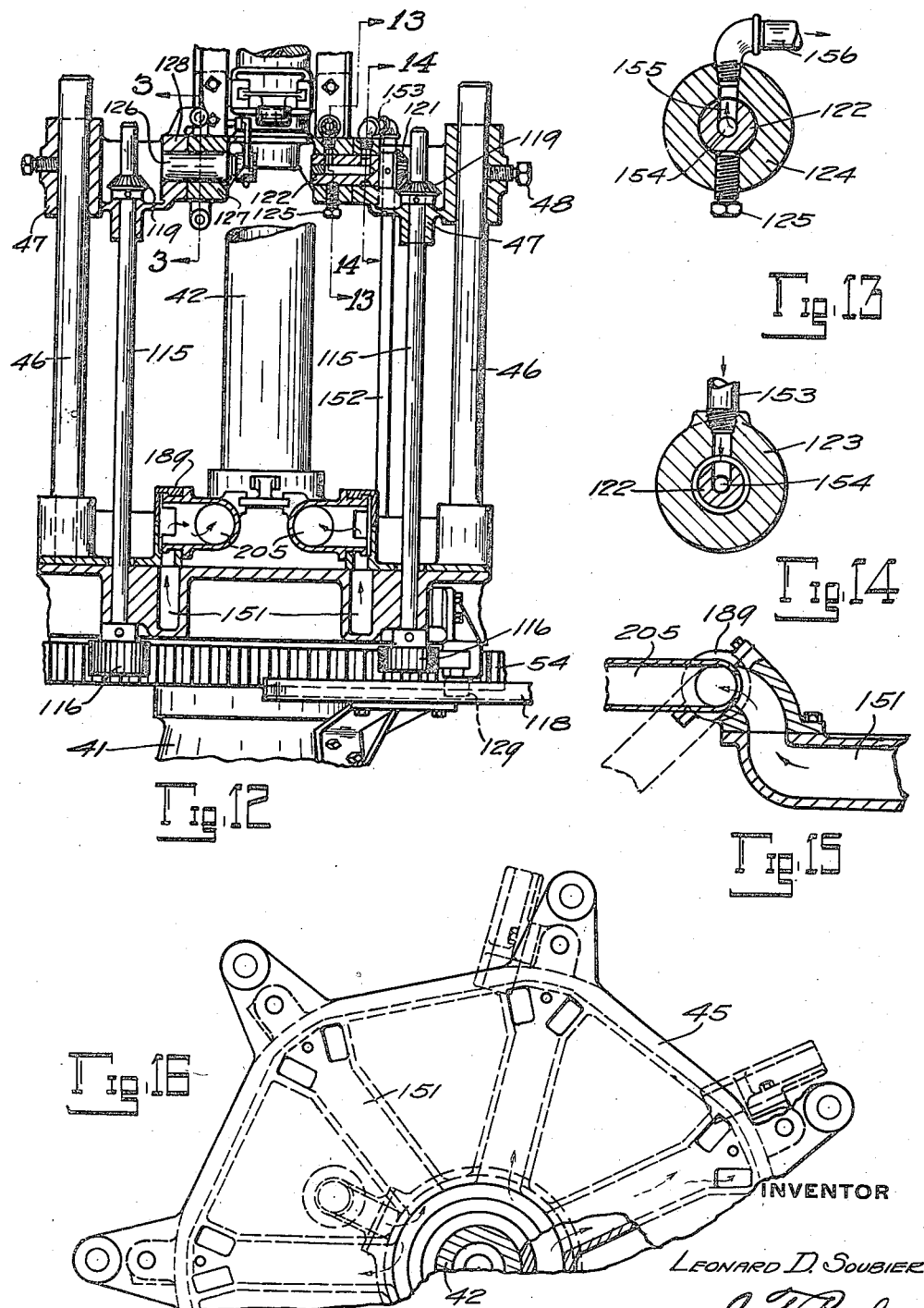

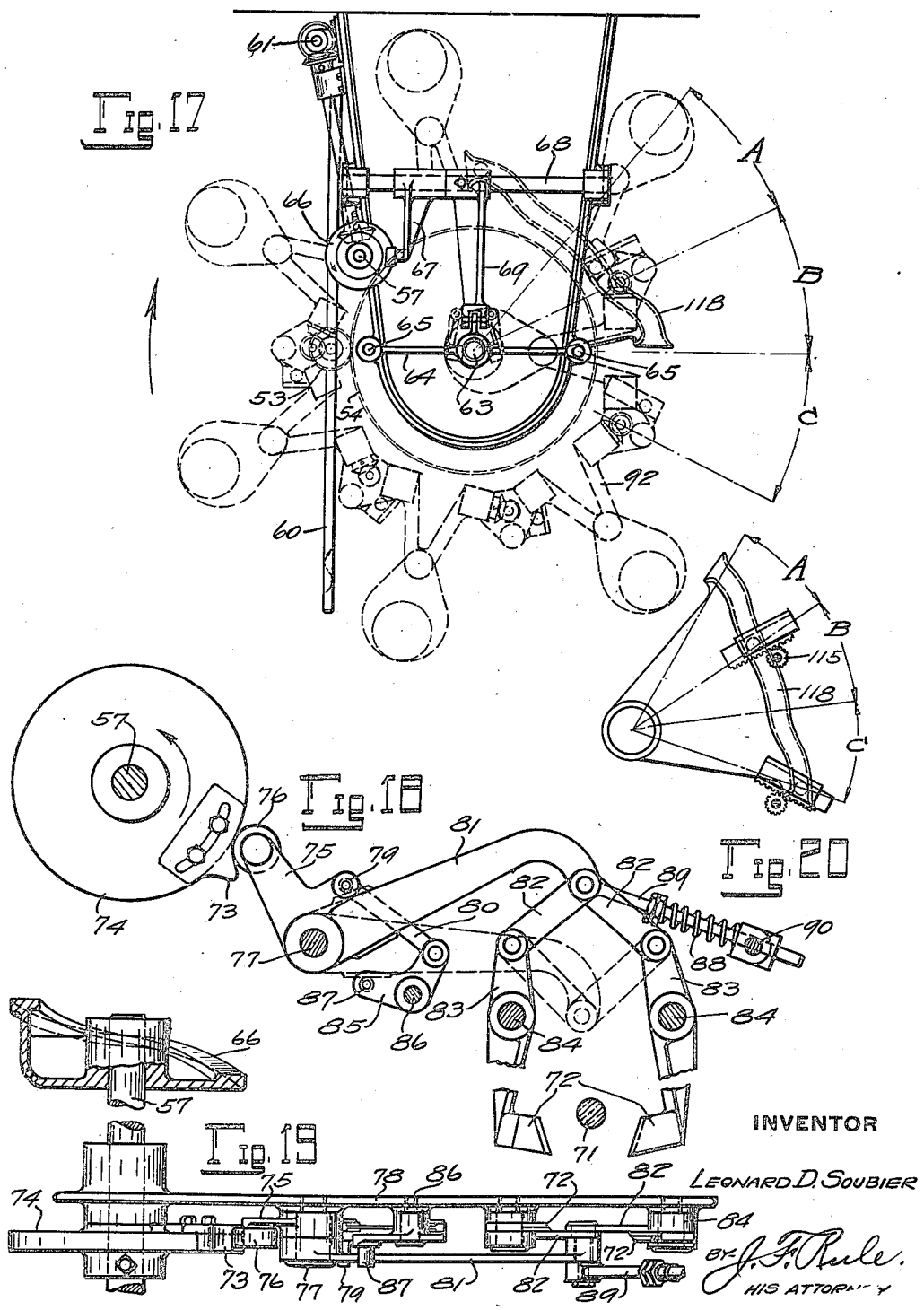

L. D. SOUBIER

GLASS FORMING MACHINE

Filed April 18, 1921 10 Sheets-Sheet 7

1,512,372

INVENTOR

Leonard D. Soubier

By J. F. Rule
HIS ATTORNEY

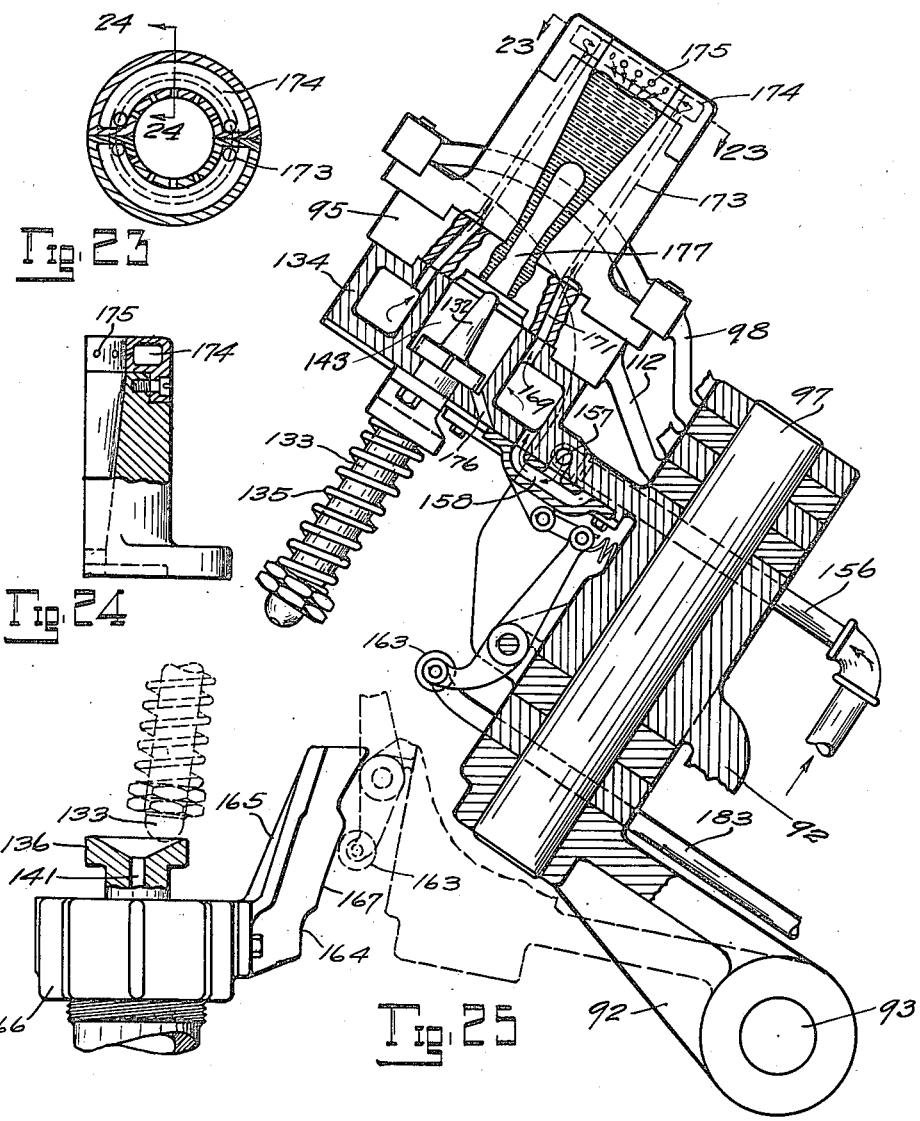

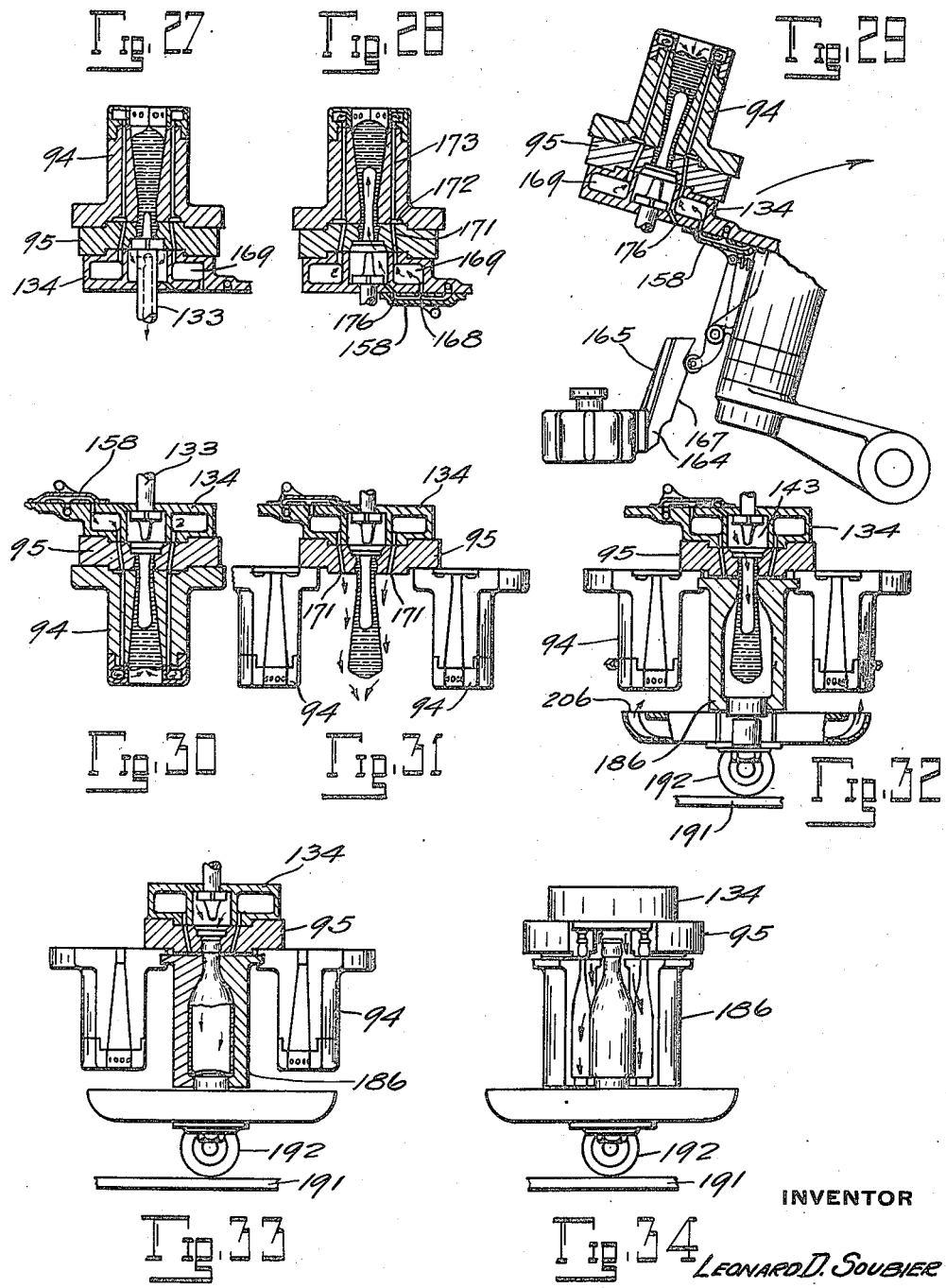

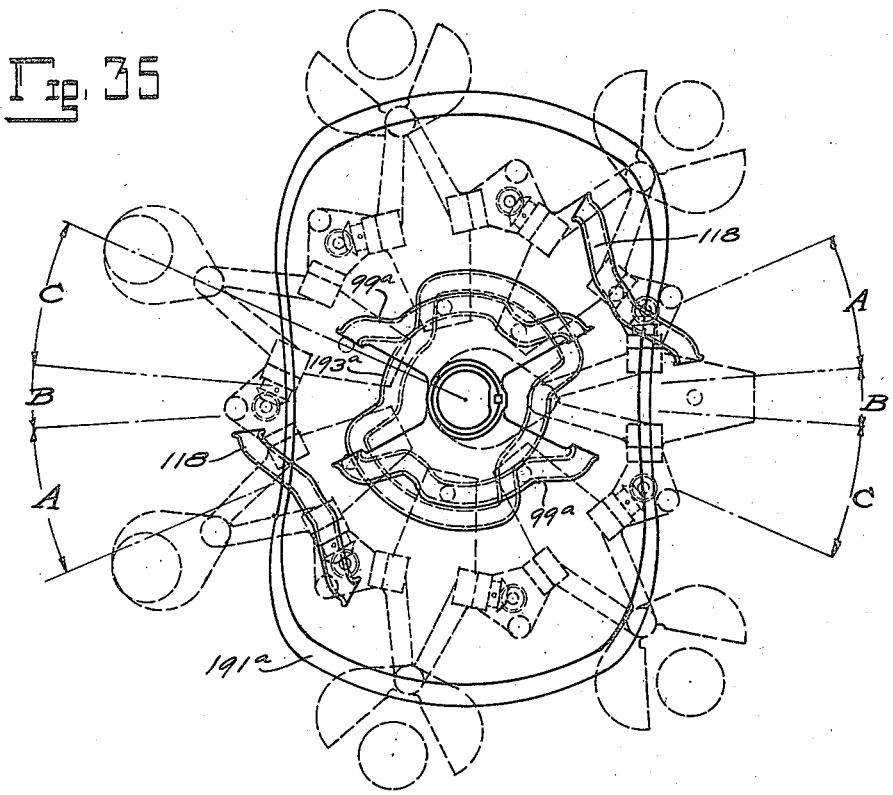
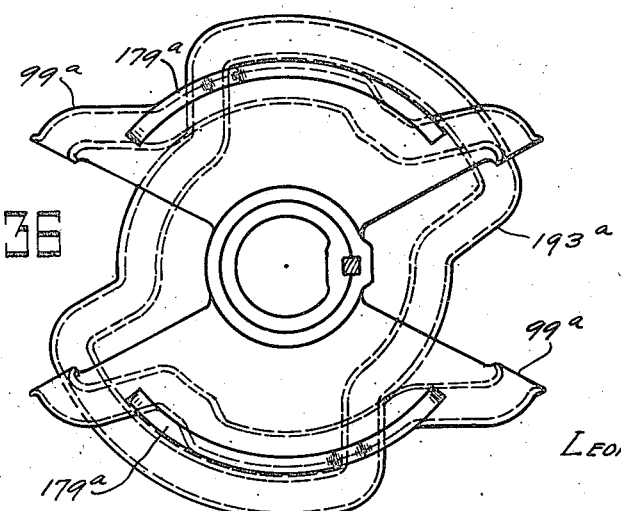

Patented Oct. 21, 1924.

1,512,372

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed April 18, 1921. Serial No. 462,107.

*To all whom it may concern:*

Be it known that I, LEONARD D. SOUBIER, a citizen of the United States, residing at Toledo, in the county of Lucas and State of Ohio, have invented new and useful Improvements in Glass-Forming Machines, of which the following is a specification.

My invention relates to machines for receiving charges of plastic glass and forming them into finished articles. An object of the invention is to provide a continuously rotating machine constructed and arranged to bring a series of molds successively to a charge receiving position and hold each mold stationary in such position while receiving its charge, in combination with means for delivering individual gobs or charges of glass to the molds.

In its preferred form, the machine comprises a continuously rotating mold carriage having an upper set of blank molds and a lower set of finishing molds to which the blanks are transferred from the blank molds and in which they are blown to finished form. Each set of molds is arranged in an annular series and means are provided for swinging the blank molds inward, one at a time, to an inverted position in which the axis of the mold coincides with the axis of rotation of the machine, to receive a charge of glass from a charger located directly over the center of the machine. The charger is constructed to form individual masses or gobs which are dropped into the inverted blank molds, and is preferably geared to the blowing machine and arranged to operate in synchronism with the movements of the molds. Each blank mold after receiving its charge is swung outward and reverted to normal position, the blank being blown therein during such movement. The parison thus formed is then transferred to the finishing mold for the final blowing operation.

Other objects of the invention will appear hereinafter.

Referring particularly to the accompanying drawings:

Figure 1 is a sectional elevation of a combined glass blowing machine and charger, the section of the machine being taken at the line 1—1 on Figure 4.

Figure 2 is a fragmentary view showing a portion of the gearing for inverting the parison mold head.

Figure 3 is a view showing a stop for limiting the movements of the mold inverting head.

Figure 4 is a top plan view of the machine.

Figure 5 is a plan view on a larger scale of the finishing mold and actuating mechanism therefor.

Figure 6 is a part sectional elevation of the lower portion of the machine.

Figure 7 is a sectional elevation through the upper portion of the center column of the machine and through a parison mold and its inverting head.

Figure 8 is a fragmentary view at the plane of the line 8—8 on Figure 7.

Figure 9 is a section through the blank mold operating cam, at the line 9—9 on Figure 10.

Figure 10 is a diagrammatic plan view of the cams for operating the blank molds and finishing molds.

Figure 11 is a sectional elevation at the line 11—11 on Figure 4.

Figure 12 is a fragmentary elevation view showing an inverting head and gearing for operating the same.

Figure 13 is a section at the line 13—13 on Figure 12.

Figure 14 is a section at the line 14—14 on Figure 12, showing air pressure connections.

Figure 15 is a fragmentary sectional elevation at the line 15—15 on Figure 5.

Figure 16 is a part sectional plan view of a distributing head through which air under pressure is distributed to the finishing molds.

Figure 17 is a diagrammatic plan view showing a gob feeder and illustrating the movements of the blank molds.

Figure 18 is a sectional plan of the shears and their actuating mechanism.

Figure 19 is a part sectional elevation of the same.

Figure 20 is a diagrammatic view of a cam and gearing for inverting a mold head.

Figure 23 is a section at the line 23—23 on Figure 25.

Figure 24 is a section at the line 24—24 on Figure 23.

Figure 25 is a sectional elevation of the blank mold inverting head in an intermediate position during the movement of the mold away from its charge receiving position.

Figure 26 is a section at the line 26—26 on Figure 7 looking in the direction of the arrows.

Figure 21:
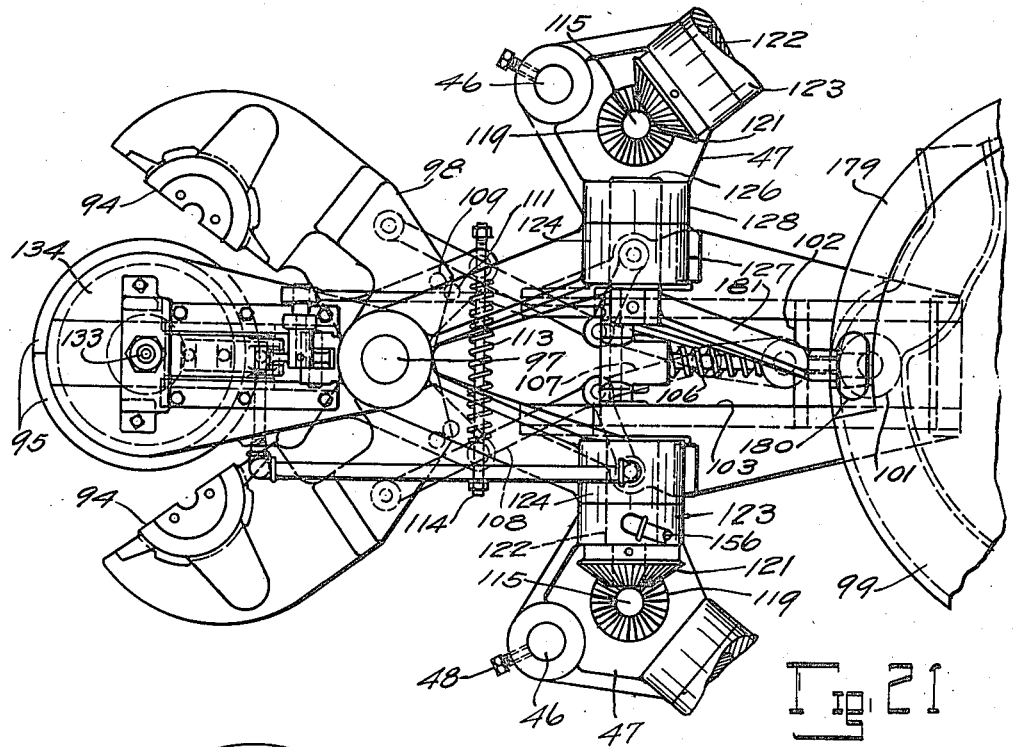
Figure 21 is a plan view showing a blank mold, a neck mold, their operating mechanism, and associated parts.

Figures 27 to 34 inclusive are diagrammatic views illustrating the molds at different periods during the formation of an article therein. Figure 27 shows the blank mold immediately after it has received its charge. Figure 28 is a similar view but with the plunger withdrawn and the blank receiving a puff of air during the initial portion of its inverting movement. Figure 29 illustrates the parts a moment later when air is being supplied at the upper end of the mold to compact the glass in the mold. Figure 30 shows the blank mold inverted. Figure 31 shows the body blank mold opened and the parison depending from the neck mold. Figure 32 shows the parison enclosed in the finishing mold. Figure 33 shows the parison blown to its final shape. Figure 34 shows the finishing mold opened and the blown article ready to be discharged from the machine.

Figure 35 is a diagrammatic view of a modification in which parison molds at opposite sides of the machine are alternately swung inward to charge receiving position.

Figure 36 is a view on a larger scale of mold operating cams shown in Figure 35.

Referring particularly to Figures 1 and 6, the machine is mounted on a wheel base or truck 40. A drum shaped casting 41 thereon supports a central hollow vertical column 42 through which air is exhausted to produce a partial vacuum employed in forming the necks of the bottles or other glass articles. The column 42 is connected through pipes 43 and 44 to any suitable source of vacuum.

The continuously rotating mold carriage comprises a base 45 consisting of a casting in the form of a spider having radial hollow arms through which air under pressure is supplied to the molds, as hereinafter explained. The base 45 is rotatively supported on the casting 41, and rising therefrom are posts 46 (see Figs. 1 and 12). Triangular shaped castings 47 formed with bearing sleeves to fit on the posts 46 and adjustably clamped to said posts by means of set screws 48, provide supports for the blank mold inverting heads and associated mechanism as hereinafter fully described. The mold carriage is rotated continuously by a motor 49 connected through suitable gearing to a vertical drive shaft 52 journalled in the base of the machine. A pinion 53 on the shaft 52 drives a ring gear 54 secured to the casting 45. A continuous rotation is thus imparted to the carriage.

The drive shaft 52 has also connections for actuating the feeder or gob forming mechanism shown in Figs. 1 and 17 to 19. These connections comprise a bevel pinion 55 on the shaft 52 running in mesh with a pinion 56 on a horizontal shaft 60 (Figs. 1 and 17) geared to a vertical shaft 61 having driving connections with a vertical cam shaft 57. Molten glass 58 may be supplied from the tank or furnace in the usual manner to the boot or extension 59 provided with an outlet orifice 62 in the bottom thereof through which the glass is discharged. The flow of glass through this outlet is regulated and controlled by a vertically reciprocating plunger 63 carried by a yoke 64 mounted on vertical posts 65. The plunger is reciprocated by a cam 66 on the shaft 57, said cam operating through a rock arm 67 (Fig. 17) on a rock shaft 68 carrying a rock arm 69 connected to the yoke 64. The plunger in its downward movement assists in expelling the glass and shaping the gob. As the plunger moves upward, it temporarily retards or interrupts the flow.

The extruded glass, in the form of a gob 71, is severed by a pair of shears 72 and dropped into the blank mold directly beneath. The shears may be operated by any approved form of mechanism. As shown, they are actuated by a cam 73 (Figs. 18 and 19) adjustably mounted on a cam disk 74 on the cam shaft 57. An arm 75 provided with a cam engaging roll 76 swings about a pivot pin 77 mounted in a stationary support 78 and carries a depending lug 79. An arm 81 also fulcrumed on the pin 77 is connected through toggle links 82 to the shear arms 83, the latter mounted on pivots 84 carried by the support 78. A bell crank lever 85 mounted on a stationary pivot pin 86, carries the lug 87 projecting downward into position to operate the arm 81. When the cam 73 strikes the roll 76, the arm 75 is actuated and the lug 79 thereon swings the arm 81 from the full line position (Fig. 18) toward the broken line position. The arm 81 thereby actuates the toggle links 82, first moving the blades 72 inward to shear the glass and then separating them during the final movement of the arm 81. The cam roll 76 is held against the cam by a spring 88 mounted on a rod 89 swinging about a fulcrum 90. This spring also operates after the links 82 pass the straight line position, to effect a quick final movement of the arm 81, thus causing a snap action of the cutter blades. The lug 87 forms a stop to limit the movement of the arm 81. During the outward movement of the arm 75 the bell crank 85 swings about its fulcrum, moving the lug 87 toward the approaching arm 81 but after the cam roll 76 has passed the peak of the cam 73 the arm 81 engages the lug 87 and reverses the movement of the bell crank 85 under the influence of the spring 88. The arm 81 is positively operated by the cam until the roll 76 reaches the peak of the cam, at which time the toggle arms are at or near their straight line position. The momentum of the arm 81 is then sufficient to carry it further to a position in which the spring 88 is effective to drive the arm and complete its movement. It will be noted that the cam 73 is shaped to impart a rapid movement to the parts 75, 81, so that the momentum of the arm 81 will be effective to carry it past its central position when moving in either direction. When the cam 73 is again brought around to operating position and again swings the arm 75 outward, the latter operates through the link 80 and bell crank 85 to move the arm 81 toward the full line position, again actuating the shears, and as the roll 76 passes the peak of the cam, the spring 88 operates to restore the parts to the position shown in full lines. It will thus be seen that each complete rotation of the cam shaft 57 effects one complete cycle of operations of the gob forming mechanism including a reciprocation of the shears to sever the formed gob.

Figure 22:
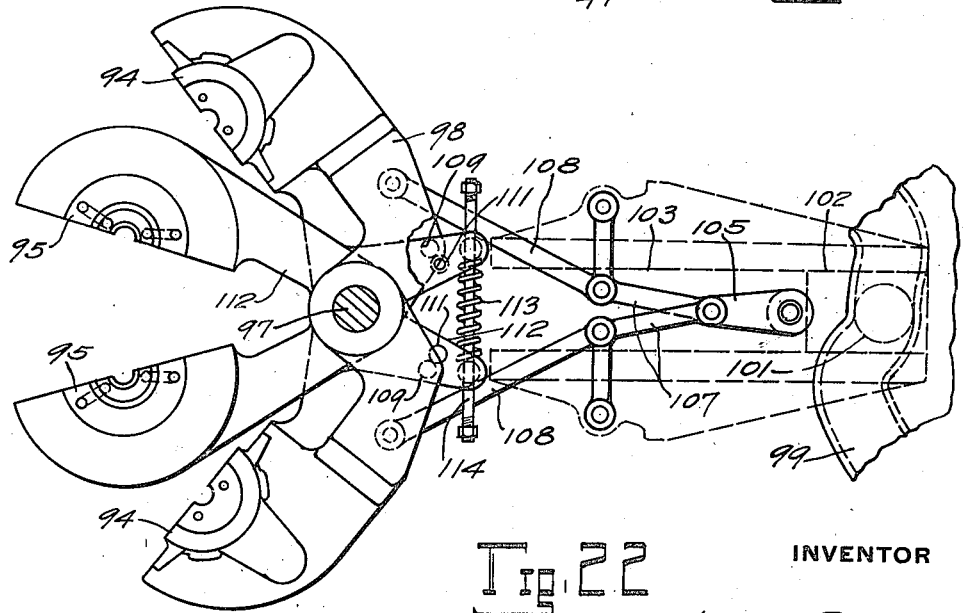
Figure 22 is a similar view, but with parts omitted and the neck mold in open position.

The mold carriage comprises a series of individual heads or units each including a blank mold, a neck mold, and mechanism for actuating them. During a complete rotation of the mold carriage, each of said units rotates about a horizontal axis and swings its molds inward to an inverted position directly beneath the charger and in line with the vertical axis of the machine to receive a charge of glass, after which said unit swings back to its normal position. Referring particularly to Figures 1, 7, 11 and 25, each said unit comprises a frame 92 mounted to swing about a horizontal axis 93 for inverting the parison mold which comprises a blank mold 94 and a neck mold 95. The frame 92 includes a sleeve extension 96 in which is mounted a pivot pin 97 forming a fulcrum for the mold sections. The blank mold 94 comprises horizontally separable sections carried by arms 98 journalled on the rod 97. These arms are actuated for opening and closing the mold by means of a stationary cam 99 (see Figs. 10, 11, 21, 22). The connections between the cam and mold sections for operating the latter comprise a cam roll 101 running in said cam. Said roll is carried by a head 102 slidable in a track 103 carried by the frame 92, said track extending radially of the machine. In a track 104 directly beneath the track 103, is a slidable head 105 having a connection 106 with the head 102. The head 105 is connected through links 107 and 108 to the mold arms 98. As the cam roll 101 is moved inward toward the axis of the machine it operates through the connections just described to swing the blank mold sections to open position. The latter operate during their opening movement to open the neck mold 95. For this purpose the arms 98 are provided with lugs 109 which, when the arms reach the intermediate position shown in Figure 21, engage lugs 111 on the neck mold arms 112 and actuate the latter to separate the neck mold sections as shown in Figure 22. During the initial closing movement of the blank mold a spring 113 on a rod 114 operates to close the neck mold. The mechanism for opening and closing the blank mold and neck mold may be substantially like that disclosed in the United States patent to La France, No. 1,185,687, Glass gathering and shaping machine, granted June 6, 1916.

The mechanism for inverting the parison molds will now be described. Associated with each inverting head is a vertical drive shaft 115 journalled in the mold carriage and provided at its lower end with a pinion 116 arranged to be actuated by a rack 117 reciprocated by a stationary cam 118. The shaft 115 carries adjacent its upper end a beveled pinion 119 which runs in mesh with a beveled pinion 121 keyed to a stud shaft 122, the latter being journalled in a bearing sleeve 123 forming part of the casting 47. The mold inverting head comprises a sleeve 124 surrounding the shaft 122 and connected to rotate therewith by means of a key 125. A stud shaft 126 in alignment with the shaft 122 extends through sleeves 127 and 128 provided respectively on the inverting head and the casting 47. It will be seen that as the vertical shaft 115 is rotated, it imparts a rotation to the mold inverting head about a horizontal axis which is perpendicular to the radius of the machine. The cam 118 (Figs. 6, 17 and 20) is so shaped that as the cam roll 129 carried with the rack 117 enters the camway, the rack is drawn radially inward and thereby rotates the shaft 115 in a direction to swing the mold inverting head upward and inward from its normal position shown in Figure 11 to the inverted position shown in Figure 7. The blank mold is thus brought to an inverted position at the center of the machine, the longitudinal axis of the mold in this position preferably being coincident with the axis of rotation of the mold carriage. This inverting movement takes place while the drive shaft 115 is transversing the arc A (Figs. 17 and 20). The inverted mold remains stationary in this charge receiving position while the shaft 115 traverses the arc B, the mold having at this time merely a slight rotative movement about its own axis. While the shaft 115 traverses the arc C, the inverting head is reverted to normal position. The movements of the inverting head are limited by a stop lug 130 (Fig. 3) in the path of adjustable stops 131 and 131ᵃ.

Associated with each parison mold, is a plunger 132 for forming the initial blow opening in the parison (see Figs. 7 and 25). This plunger is provided with a stem 133 mounted for endwise movement in a blowing head 134 carried by the frame 92. The plunger is held in its retracted position (Fig. 25) by a spring 135 mounted on the stem 133. As the mold approaches the limit of its inverting movement, the lower end of the stem 133 engages the concave upper face of a valve 136, whereby the plunger is caused to move upwardly relative to the mold, to the Figure 7 position, compressing the spring 135.

A partial vacuum is applied to the neck mold to form the neck of the bottle while the mold is in its charge receiving position. For this purpose air is exhausted through the center column 42 and pipes 43 and 44 (Fig. 6) as hereinbefore noted. The valve 136 opens communication between the exhaust and the neck mold when said valve is lowered by the plunger stem 133, which lowering of the valve takes place during the final downward movement of the mold, after the plunger has been projected into the neck mold. This lowering of the valve 136 is against the tension of a spring 137 and opens to the exhaust ports 138 in the valve. The valve stem slides vertically through a stationary sleeve 139 and when the valve is up, closes the ports 138. Said ports communicate with a passageway 141 extending vertically through the valve. Openings 142 (see Fig. 26) extending transversely of the valve, connect the ports 138 with the central passage 141. The latter connects with a passageway extending through the plunger stem 133 when said stem is in the Figure 7 position. This latter passageway connects with a chamber 143 surrounding the plunger, so that the air is exhausted from the neck mold, thereby forming the neck of the bottle. When the blank mold communicates its upward movement the valve 136 is permitted to rise and immediately cuts off the vacuum.

Air under pressure is supplied to the upper end of the blank while in the blank mold for compacting the glass and is also momentarily supplied to the neck end of the blank as the blank mold commences its reverting movement. Referring to Figure 6, the air pressure is supplied through a stationary pipe 144 which registers with a vertical pipe 145 on the machine. The pipe 145 may terminate in a head 146 which, when the machine is in position, rests on a spring pressed sleeve 147 attached to the pipe 144. The air from the pipe 145 enters an annular passageway 148 and is distributed through ports 149 to the radial channels 151 in the head 45. The air is conveyed from this head through vertical pipes 152, each of which at its upper end connects through a pipe section 153 (see Figs. 12 and 14) with a bearing sleeve 123. The air is carried through said sleeve to a passageway 154 extending lengthwise of the shaft 122, said passageway terminating in a port 155 (Fig. 13), which, when the blank mold is in its charge receiving position, registers with an opening in the bearing sleeve 124 on the inverting head. From thence the air is carried through a pipe 156 on the inverting head to a port 157 (Fig. 8) controlled by a slide valve 158.

While the mold is in its charge receiving position, the slide valve closes the port 157, the valve being held in such position by a spring 159 connected to the valve through a link 160. A lever 162 carries a cam roll 163 which bears against a surface 164 of a cam 165, the latter being mounted on a stationary head 166 at the upper end of the column 42. When the parison mold commences its upward movement after receiving its charge, the roll 163 runs off the surface 164 onto a high portion 167 of the cam and thereby shifts the slide valve to the left and connects the air pressure through a port 168 to the annular chamber 169 in the blow head 134. This position of parts is shown in Figure 28. The air is conducted through openings 171 in the neck mold to an annular passage 172 in the face of the blank mold. From thence the air is conducted through passageways 173 to an annular chamber 174 (Figs. 23 to 25) in the outer end of the blank mold. An annular series of downwardly convergent perforations 175 extend through the inner wall of the chamber 174. The air under pressure is blown through these perforations in downwardly converging streams against the glass in the end of the blank mold, thereby compacting the glass in the mold.

When the slide valve is positioned by the cam surface 167, the air pressure is also connected through a port 176 to the central chamber 143 in the blow head. The air pressure in this chamber is transmitted to the initial blow opening 177, the plunger being at this time withdrawn so that the parison is blown to the form shown in Figure 25. This blowing of the parison only takes place during the brief interval of time that the cam roll is running on the high surface 167 of the cam. As the roll runs off this surface the slide valve is pulled to the position shown in Figures 25 and 29, thereby opening the port 176 to the outside air, but maintaining a connection from the air pressure to the outer chamber 169 of the blowhead. The supply of air to the outer end of the parison is thus maintained until the reverting movement of the mold is completed. The air blown against the outer end of the parison not only compacts the glass in the mold, but also serves to shape it to a certain extent, prevents it from sagging, and assists in chilling the surface sufficiently to insure a suitable thickness of the bottom of the blown article.

After the mold has been swung outward, the cam roll 101 on the inverting head enters the cam groove of the cam 99 at the end 178 (Fig. 9) and is drawn inward by said cam to open the blank mold. As the blank mold begins to open, the slide valve 158 is shifted to cut off the supply of air to the blowhead. This movement of the valve is effected by a stationary cam 179 which is engaged by a cam roll 180 on a rock arm 181 having connection through an arm 182 and link 183 with the lever 162. The cam 179 may have a step 184 (Fig. 11) to cause a partial cutting off or throttling of the air supply to the blowhead so that as the blank mold opens, the air passing through the neck mold passages 171 will envelop the bare blank as indicated by the arrows (Fig. 31) and assist in cooling the outer surface of the blank. When the cam roll runs off the surface 184 onto the main or high surface of the cam, the slide valve is shifted into position to cut off the supply of air to the chamber 169 and opens the port 176 so that air is supplied through the central chamber 143 of the blowing head for blowing the blank in the finishing mold which is now closing or is closed around the parison.

Referring particularly to Figures 5 and 11, the finishing mold sections 186 swing about a fulcrum pin 187 for opening and closing the mold. The pin 187 is carried on a mold arm 188 having bearings 189 permitting the mold arm to swing about a horizontal axis. This movement of the mold arm is controlled by a stationary track 191 on which runs a roll 192 on the mold arm 188. The track 191 holds the mold up in register with the neck mold during the greater portion of its revolution with the mold carriage, but permits the mold arm to dip to the Figure 11 position to clear the blank mold and its inverting head during the inverting and reverting movements of the blank mold, and while the blank mold is closed. The opening and closing movements of the finishing mold are effected by a stationary cam 193 on which runs a cam roll 194 carried by a head 195 slidable radially on the mold carriage in a guideway 196. The sliding head 195 is connected through a link 197 to a head 198 slidable in guideways 199 in the arm 188. The head 198 is connected through links 201 with arms 202 having a fulcrum 203, said arms connected at their outer ends through links 204 with the mold sections or their supporting arms for opening and closing the mold. After the blank mold has received its charge and has been returned to normal position and opened, as shown diagrammatically in Figure 31, the finishing mold swings upward and is closed around the parison, and the latter is blown to finished form as heretofore explained.

Air for cooling the blank molds may be supplied through the radial channels 151 (see Figs. 15 and 16), which at their outer ends communicate with channels 205 extending lengthwise of the finishing mold arm 188 to openings 206 (see also Fig. 32) through which the air is blown against the molds.

When the finishing mold is opened to discharge a bottle, the latter may be supported by a so-called knock-out disk 207 (Fig. 11), which may be of the usual construction and operation employed with the Owens types of machines, as shown and described in detail, for example, in the patent to La France, No. 1,319,098, October 21, 1919. The disk 207 is carried on a rock arm 208 on a rock shaft 209 which is adapted for both longitudinal and rotary movement. The rod 209 is moved lengthwise by a cam 211 and rotated by a cam 212. These movements are such as to bring the disk 207 down onto the neck end of the bottle and hold the latter while the finishing mold opens. The disk is then swung to one side, thereby tilting the bottle and discharging it.

Figures 35 and 36 illustrate a modification in which blank molds are swung into charge receiving position alternately from opposite sides of the machine. Each mold thus receives a charge during each half revolution of the mold carriage. To effect the inverting movements of the molds, two cams 118 are provided at diametrically opposite positions, each of these cams operating in the manner heretofore described. There are likewise provided two oppositely disposed cams 99ª for opening and closing the blank molds, these cams differing from the cam 99 in that they are shaped to hold the blank molds open only a comparatively short time. A cam 193ª is provided for opening and closing the finishing molds, this cam being the same in function and operation as the cam 193, except that it opens and closes the molds twice during each rotation of the carriage. A double track 191ª controls the dipping movements of the finishing mold. Cams 179ª control the slide valves as described in connection with the cam 179.

Modifications may be resorted to within the spirit and scope of my invention.

What I claim is:

1. A glass forming machine comprising, in combination, a mold carriage, molds thereon, and means to rotate said carriage and move the molds radially inward to a charging station, and hold each mold at said station to receive its charge while the carriage is rotating.

2. The combination of a mold carriage, molds thereon, and means to rotate the carriage continuously and move the molds radially inward successively to a charging station and hold each mold against movement of translation at said station while receiving a charge.

3. In a glass forming machine, the combination of a mold carriage, blank molds and finishing molds thereon, means to rotate said carriage, and means to move the blank molds inward toward the axis of the carriage and temporarily arrest their travel at the completion of said inward movement while the finishing molds continue their travel.

4. In a glass forming machine, the combination with a continuously rotating mold carriage, of finishing molds carried thereon, blank molds on the carriage over the finishing molds, means to move each blank mold toward the axis of the carriage into a charge receiving position and hold it in said position during a predetermined period while the carriage is traveling and then return said blank mold to its position over the finishing mold, and means to transfer the blank to the finishing mold.

5. In a glass forming machine, the combination of a continuously rotating mold carriage, a series of parison molds thereon each comprising a neck mold and a body blank mold, finishing molds on the carriage, means to bring the parison molds successively to a charging position at the axis of the mold carriage and hold them in such position while receiving a charge, means to return each charged parison mold, means to open the blank mold leaving the bare parison supported in the neck mold, and means to then close the finishing mold around the parison and blow the latter to finished form.

6. In a glass forming machine, the combination of a rotary mold carriage, parison molds thereon, cooperating finishing molds, means to swing each parison mold inwardly about a horizontal axis and thereby invert it and bring it to a charge receiving position in which it is held while a charge of glass is introduced therein, and to then revert the mold, and means to transfer the charge to the corresponding finishing mold.

7. The combination of a mold carriage, molds thereon, means to rotate the carriage, and means to move each mold radially inward toward the axis of the mold carriage to a charge receiving position at which it receives its charge and to then return it.

8. In a glass forming machine, the combination of a mold carriage rotatable about a vertical axis, an annular series of molds thereon, automatic means to move the molds successively inward toward the axis of the mold carriage to a charge receiving position, and means to charge the molds while at said position.

9. In a glass forming machine, the combination of a mold carriage rotatable about a vertical axis, an annular series of molds thereon, and means to swing each mold inward about a horizontal axis to invert the mold and bring it to a charge receiving position and to revert the mold after it has received its charge.

10. The combination of a rotary mold carriage, a mold thereon, and means to periodically move the mold inward to a position in which its axis coincides with the axis of rotation of the carriage and to return the mold.

11. In a glass forming machine, the combination of a mold carriage, molds thereon, and means to swing the molds individually about a horizontal axis so positioned that the mold will be inverted and brought into alignment with the axis of the mold carriage.

12. The combination of a continuously rotating mold carriage, molds mounted to travel therewith, and means to swing the molds individually inward about a horizontal axis to a position in line with the carriage axis.

13. In glass forming mechanism, the combination of a mold carriage rotatable about a vertical axis, a mold thereon, means for delivering a charge of molten glass at the axis of the carriage, and means to move the mold to said axis, in which position it receives said charge.

14. The combination of a mold carriage rotatable about a vertical axis, molds thereon, means to bring the molds individually into a charge receiving position at said axis, and means to form gobs of glass and drop them into the molds while the latter are in said position.

15. The combination of a glass forming machine comprising a mold carriage rotatable about a vertical axis, molds thereon, and means for delivering charges of glass to the molds at said axis.

16. The combination of a mold carriage rotatable about a vertical axis, molds thereon, means to bring the molds into a charge receiving position at said axis, a charger arranged above the machine, and means to operate said charger in synchronism with the movements of the molds and deliver charges of glass to the molds while in said charge receiving position.

17. The combination of a rotary mold carriage, molds thereon, means to bring the molds successively to a charge receiving position at the axis of the carriage, and means operating in synchronism with the movements of the molds to deliver a charge of glass to each mold when in said receiving position.

18. The combination of a rotary mold carriage, a series of individual units each comprising a frame mounted on the carriage for rotation about a horizontal axis tangent to its path of movement with the carriage, a mold carried by each unit, and automatic means for rotating each said unit about its axis and swinging the mold inward to an inverted position in line with the axis of the carriage.

19. The combination of a rotary mold carriage, a series of individual units each comprising a frame mounted on the carriage for rotation about a horizontal axis tangent to its path of movement with the carriage, a mold carried by each unit, and automatic means for rotating each said unit about its axis and swinging the mold inward to an inverted position in line with the axis of the carriage, said units comprising mechanism for opening and closing the molds.

20. The combination of a rotary mold carriage, a series of individual units each comprising a frame mounted on the carriage for rotation about a horizontal axis tangent to its path of movement with the carriage, a mold carried by each unit, automatic means for rotating each said unit about its axis and swinging the mold inward to an inverted position in line with the axis of the carriage, said units each comprising mold opening and closing mechanism, and a stationary cam for actuating said mechanisms.

21. The combination of a rotary carriage, individually operable mold inverting heads carried therewith, molds carried by said heads, each head being mounted to swing about a horizontal axis and carry its mold inward to a charge receiving position in line with the axis of the carriage, mold opening and closing mechanism carried on said heads, and a stationary cam for operating said mechanism.

22. The combination of a mold carriage, a mold, a plunger operable to form an initial blow opening in a charge of glass in the mold, means for inverting said mold and bringing it to a charge receiving position, means to move said plunger into operative position as the mold is inverted, and a valve actuated by the plunger to control the air pressure within the mold.

23. In a glass forming machine, the combination of a mold, means to swing it about a horizontal axis to invert the mold and bring it to a charge receiving position, a plunger comprising a hollow stem movable lengthwise to project the plunger into the mold, and a valve in the path of said stem operable to project the plunger into the mold as the latter is brought toward its charge receiving position, said stem operable to actuate the valve and thereby connect the mold with a source of rarefied air.

24. In a glass forming machine, the combination of a rotary mold carriage, molds thereon, means for inverting the molds, a valve controlling a supply of air to the molds, a cam operable during the inverting movement of the mold to actuate said valve, and a stationary cam operable through the travel of the mold with the carriage to actuate said valve.

25. In a glass forming machine, the combination of a rotary mold carriage, a blank mold thereon open at one end, means to introduce a charge of glass into the mold through said open end, and automatic means to apply a blast of air at said end against the glass in the mold while said end remains open to permit the escape of the air blown against the glass.

26. In a glass forming machine, the combination of a rotary mold carriage, molds thereon open to receive charges of glass, and automatic means to direct convergent streams of a fluid under pressure against the glass in the molds while the latter are open.

27. The combination of a mold, means providing an annular chamber adjacent one end of the mold, the inner wall of said chamber being formed with an annular series of perforations converging inwardly in directions inclined to the axis of the mold, and means to supply a fluid under pressure to said chamber.

28. In a glass forming machine, the combination of an open ended blank mold, means to invert the mold with its open end upward to receive a charge of glass, means to then revert the mold, and means to supply a fluid under pressure through said open end against the glass in the mold while the latter is being reverted.

29. In a glass forming machine, the combination of a rotary mold carriage, a series of mold inverting heads thereon, vertical shafts mounted on the carriage, a pinion on each shaft, a rack carried with each pinion for driving it, a stationary cam operable to reciprocate each said rack at predetermined times during the travel of the carriage, and gearing between said shafts and heads for rotating the latter and thereby inverting and reverting the molds.

30. In a glass forming machine, the combination of a rotating carriage, blank molds, inverting heads by which the blank molds are carried, said heads connected to rotate with the carriage, means to swing said heads about horizontal axes for inverting the blank molds and bringing them to a charge receiving position at the center of the machine, finishing molds, supporting devices therefor connected to rotate with the carriage, and a track on which said devices run, said track formed to lower the finishing molds into position to clear the blank molds and their inverting heads and to move the finishing molds upward into position to receive the blanks when the blank molds are opened.

31. In a glass forming machine, the combination of a rotary mold carriage, an annular series of molds supported thereon, and automatic means to swing the molds alternately from opposite sides of the machine to a charging position at the center of the machine.

32. In a glass forming machine, the combination of a rotary mold carriage, molds thereon, and automatic means to swing each mold inward to a charge receiving position at the center of the machine and return it a plurality of times during each complete rotation of the mold carriage.

33. The combination of a continuously rotating mold carriage, an annular series of molds thereon, and automatic means to swing each mold inward to an inverted charge receiving position at the center of the machine, hold it stationary in such position while receiving a charge and then revert it to normal position, the said inward and outward movements of each mold being effected a plurality of times during each complete rotation of the mold carriage.

34. The process of making hollow glassware that comprises depositing a charge of molten glass in a mold, blowing air into said mold from beneath, thereby expanding the glass upwardly, and directing a stream of cooling fluid upon the expanding glass from above while the mold is open above the expanding glass.

35. The process of making hollow glassware that comprises placing a charge of molten glass in an inverted mold having a neck cavity, causing the glass to settle into said neck cavity, blowing air into said glass from beneath, thereby causing the glass to expand upwardly, and directing a stream of cooling fluid upon the upwardly expanding glass while the mold is open above the expanding glass.

Signed at Toledo, in the county of Lucas and State of Ohio, this 15th day of April, 1921.

LEONARD D. SOUBIER.